United States Patent

[11] 3,634,778

[72] Inventors Gorken Melikian
Springfield, Mass.;
Frank R. Biancardi, Vernon, Conn.
[21] Appl. No. 858,565
[22] Filed Sept. 10, 1969
[45] Patented Jan. 11, 1972
[73] Assignee United Aircraft Corporation
East Hartford, Conn.

[54] CLOSED-CYCLE GAS LASER SYSTEM
10 Claims, 5 Drawing Figs.

[52] U.S. Cl. ..................................................... 331/94.5,
23/2
[51] Int. Cl. ............................................... H01s 3/02
[50] Field of Search .......................................... 331/94.5;
23/2, 3 L, 232; 55/68

[56] References Cited
UNITED STATES PATENTS
| | | | |
|---|---|---|---|
| 3,439,288 | 4/1969 | Mangin .................... | 331/94.5 |
| 2,832,666 | 4/1958 | Nertzberg et al. ............ | 331/94.5 UX |
| 3,391,281 | 7/1968 | Eerkens..................... | 331/94.5 |
| 3,435,363 | 3/1969 | Patel ........................ | 330/4.3 |
| 3,435,373 | 3/1969 | Wolff........................ | 331/94.5 |

*Primary Examiner*—Rodney D. Bennett, Jr.
*Assistant Examiner*—N. Moskowitz
*Attorney*—Melvin Pearson Williams

ABSTRACT: A gas laser of the mixing type which separately excites an energizing gas (such as $N_2$) and causes the mixing of a lasing gas (such as $CO_2$) with the energizing gas in or near the optical cavity, includes a lasing gas recovery separator so as to permit closed-cycle operation. Each of the embodiments includes a primer mover such as a gas turbine or a diesel engine that operates a compressor to create the gaseous flow necessary for operating the laser. Either the prime mover, or the gaseous flow and a turbine expander, may be utilized to operate an electric generator for exciting the energizing gas. In a first embodiment, the gas effluent from the laser is first passed through a regenerative cooling heat exchanger, then through a water-cooled heat exchanger, through the compressor, and a second water-cooled heat exchanger into the carbon dioxide separator. From the separator it is passed through the coolant side of the regenerative heat exchanger, and is then warmed in a heat exchanger heated by prime mover exhaust and passed through a turbine which expands and thereby cools the flow of gas and renders it suitable for passage to the laser, the shaft of the turbine driving the electric generator. Water cooling, for the heat exchangers which use it, may be provided in an air-cooled closed-cycle water system, or by a suitable expendable source of external water.

In a second embodiment, the regenerative and water-cooled heat exchangers are eliminated, a somewhat larger compressor is used, and the warmer gas is utilized as a source of heat for the stripper portion of a monoethanolamine (hereinafter "MEA") absorbent, carbon dioxide separator; in other respects it is the same as the first embodiment.

In a third embodiment, the electric generator and compressor are on the same shaft with the turbine, and water-cooled heat exchangers are used at the input and output of the compressor. No work is performed on or with the gas flow as it leaves the carbon dioxide separator. In other respects, this embodiment is similar to the first embodiment.

FIG 2

CLOSED-CYCLE GAS LASER SYSTEM

BACKGROUND OF THE INVENTION

1. Field of Invention

This invention relates to gas lasers, and more particularly to closed-cycle systems for gas lasers of the mixing type.

2. Description of the Prior Art

A recent innovation in gas lasers provides for introducing, into the main flow through the laser, directly at the laser cavity, a lasing gas such as $CO_2$; the flow includes an energizing gas such as nitrogen (and possibly a relaxant such as helium or water vapor) which is energized upstream of the laser chamber. Operation of these devices in open cycle systems requires large-capacity sources of $CO_2$ and nitrogen, and result in the lasing effluent, comprising waste gas, vented to ambient.

SUMMARY OF INVENTION

The object of the present invention is to provide closed-cycle operation of gas lasers of the mixing type.

According to the present invention, a closed-cycle system for a flowing gas laser of the mixing variety includes a recovery separator for separating the lasing gas from the gas that passes through the excitation means, together with means for providing gaseous flow through the system at a pressure suitable for operating the separator. According further with the present invention, the temperature of the gas may be reduced before pressurizing. According still further with the present invention, the temperature of the gas before pressurizing may be reduced by a regenerative heat exchanger or by an ambient heat exchanger, or both. According to the present invention further, the temperature of the main gas flow may be reduced after pressurization and before separation. In accordance further with the present invention, a temperature reduction after separation of the gases may be effected; this may be in a regenerative heat exchanger. In further accord with the present invention, the main gas flow may pass through a turbine expander to become cooled and to assume a lower pressure; in still further accord with the invention, the turbine may be utilized to generate electric power for operation of the laser excitation means.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
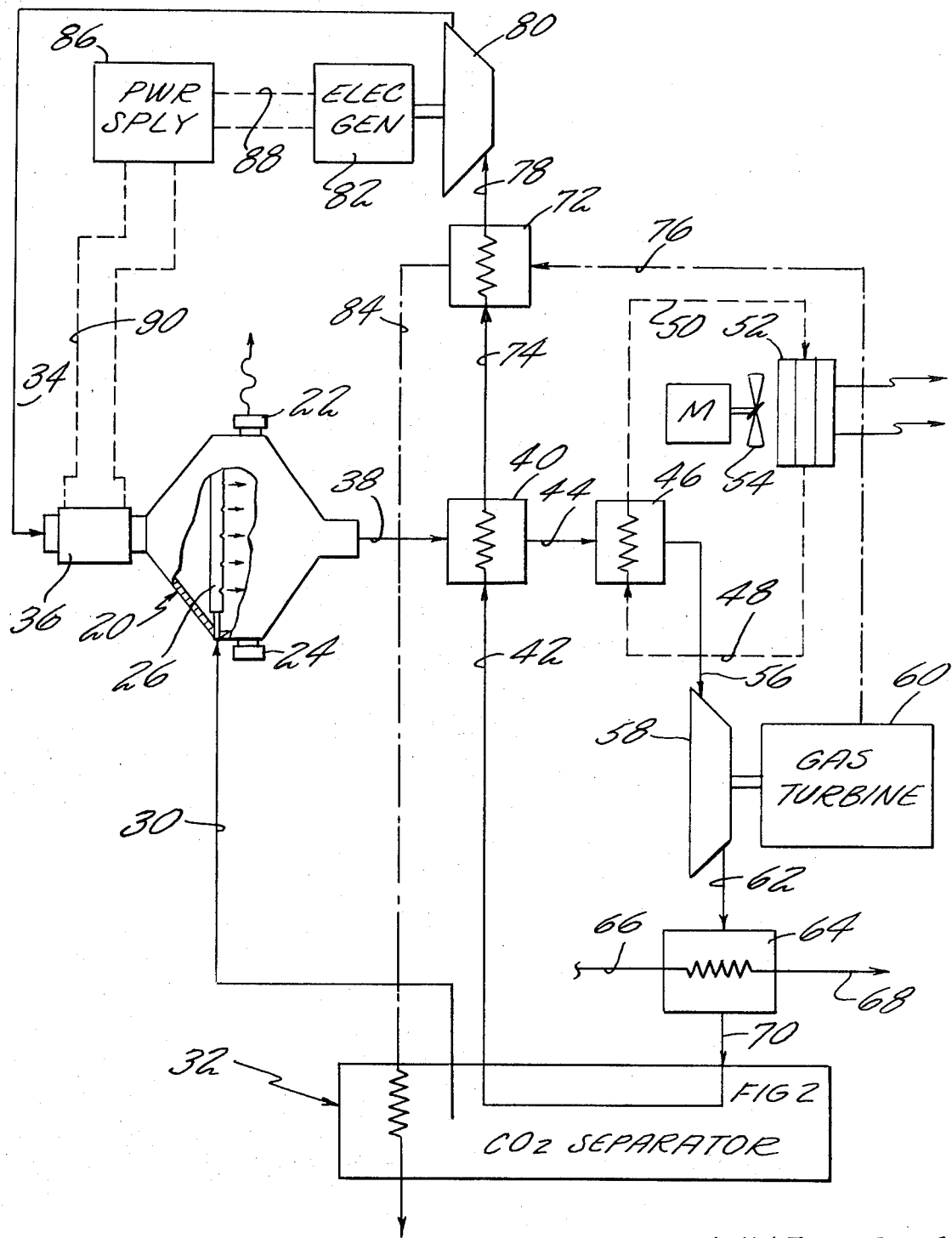
FIGS. 1, 3, and 5 are simplified schematic diagrams of respective illustrative embodiments of the present invention.

Referring now to FIG. 1, a gas laser 20 includes an optical cavity having mirrors 22, 24 into which is injected a lasing gas such as carbon dioxide by means of an injecting rod or spray bar 26 which may be connected by a conduit 30 to a $CO_2$ separator 32. The gas laser 20 also receives energizing and relaxing gases (such as nitrogen and helium) from a conduit 34 which are passed through an excitation means such as a DC electric discharge or plasma generator 36. As is known in the gas laser art, the energized nitrogen assumes vibrational energy levels, and can quickly transfer energy through resonant collisions with the molecules of $CO_2$ directly within the laser cavity, the energy level assumed by the $CO_2$ being an upper laser level which results in spontaneous and stimulated emission of coherent light, thus resulting in a useful laser output. The objective of the present invention is to provide, in a closed cycle, $CO_2$ in the conduit 30, and energizing and relaxant gases in the conduit 34. A further objective is to do this with a minimum of expense and weight, and with a maximum of efficiency.

Figure 2:
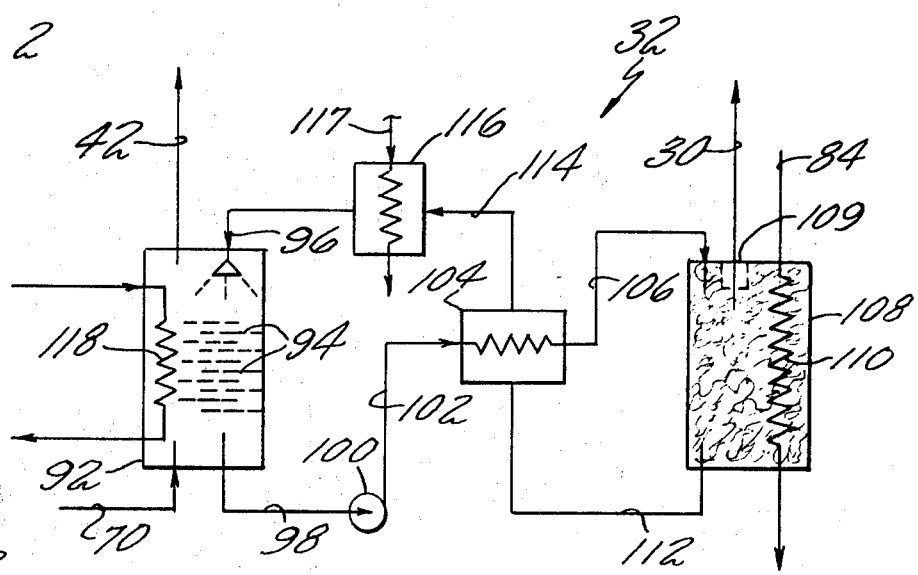
FIGS. 2 and 4 are schematic diagrams of separators for use in the embodiment of FIGS. 1 and 5, and of FIG. 3, respectively.

The outflow of the gas laser 20 is passed over a conduit 38 to a regenerative heat exchanger 40 which removes heat from the gas in the conduit 38 and adds heat to the gas applied to the heat exchanger 40 in a conduit 42. Additional aspects of the heat exchanger 40 are described hereinafter. From the heat exchanger 40, the gas flows through a conduit 44 to a second heat exchanger 46 which may be cooled by water flowing in conduits 48, 50 which is cooled in a radiator 52 in response to ambient air supplied thereto by a fan 54. From the heat exchanged 46, the cooled gas is passed by a conduit 56 into a compressor 58 which may be driven by any prime mover, such as a gas turbine 60. The compressor 58 supplies the flow energy to circulate the required gas flow in the entire system. It also results in the gas within a conduit 62 being warmer than within the conduit 56, so that the conduit 62 is connected to another heat exchanger 64 which may have ambient water available at the site, or from a cooling tower, passed therethrough from a conduit 66 to a conduit 68. On the other hand, the conduits 66, 68 may be included within the loop provided by the conduits 48 and 50 and thereby carry water cooled by the radiator 52 (as is true in the heat exchanged 46). From the heat exchanger 64, the main gas flow is carried by a conduit 70 into the $CO_2$ separator 32 (the details of which are shown in FIG. 2 and described hereinafter). With the $CO_2$ separator 32, the carbon dioxide is separated from the main gas flow so that the conduit 42 has essentially no carbon dioxide in it, and virtually all the carbon dioxide which is supplied to the separator by conduit 70 appears in the conduit 30. As a result of the process within the $CO_2$ separator 32 (described hereinafter), the main gas flow (comprising substantially only the energizing and relaxant gases) in the conduit 42 is about the same temperature as the temperature in conduit 70. However, this gas flow picks up additional heat in the regenerative heat exchanger 40 and in a heat exchanger 72 to which it is connected by a conduit 74. The heat exchanger 72 derives heat from the gas turbine exhaust connected thereto by a conduit 76 so that the main flow of gas in a conduit 78 is applied to an expander (or turbine) 80 at a sufficiently high temperature so that the expander 80 can supply the requisite power to operate an electric generator 82. The gas turbine exhaust which flows from the conduit 76 through the heat exchanger 72 is passed by a conduit 84 to the $CO_2$ separator 32 to provide heat for the processes therein, as described hereinafter. The electric generator 82 supplies electric power to a power supply and conditioner 86 (connected thereto by wires 88) which in turn provides suitable high-voltage DC power (over wires 90) to the electric discharge or plasma generator 36 used to excite the energizing gas within the gas laser 20.

The $CO_2$ separator 32 is illustrated in FIG. 2. Therein, the main gas stream in conduit 70 flows into an absorber tank 92, which, as is known in the art, may comprise a plurality of trays or plates 94 having holes therein; or it can be a packed tower, as is known in the art. As the main gas flow (70) passes through the liquid within the absorber tank 92, the carbon dioxide in the gas goes into solution within the liquid within the tank. Typically, such liquid is monoethanolamine (herein referred to as MEA). As the gas reaches the top of the chamber or tank 92, substantially pure MEA, which may have traces of $CO_2$ in it, is sprayed on the gas at an inlet 96 which tends to wash out substantially all of the $CO_2$ from the primary gas flow. The primary gas thereafter flows out the conduit 42. The MEA, with substantial $CO_2$ absorbed therein, is passed over a conduit 98 by means of a suitable circulating pump 100 and through a conduit 102 to a regenerative heat exchanger 104. The purpose of this heat exchanger 104 is to begin to add heat to the $CO_2$-rich MEA, since removal of $CO_2$ from the MEA is achieved with heat. It also cools the return flow of MEA prior to eventual reentry into the absorber tank 92. From the heat exchanger 104, a conduit 106 carries the $CO_2$-rich, warm MEA to a stripper chamber 108 wherein the $CO_2$ is desorbed from the MEA by heat. This form of stripper is well known in the art. The prime mover exhaust gas, applied through the conduit 84 into a heat exchange element 110, provides heat to the stripper 108, that causes the outgasing of $CO_2$ from the MEA solution, the $CO_2$ being passed through a cold trap unit 109 (known to the art) to remove traces of possible contaminants (such as water and MEA) before being released from the stripper in the conduit 30 for return to the gas laser 20 (FIG. 1). The $CO_2$ in the conduit 30 is substantially pure, depending upon proper adjustment and selection of the operating parameters of the $CO_2$ separator 32. The high-temperature MEA, having the $CO_2$ essentially all boiled therefrom, passes out of the stripper 108 in a conduit 112, where a large portion of its heat is given off to the $CO_2$-rich, inflowing MEA in conduit 102 via the regenerative heat exchanger 104. The somewhat cooled MEA is then passed by a conduit 114 through a heat exchanger 116 and into the inlet 96. The heat exchanger 116 may have coolant water passed therethrough (117), which may be ambient water, water from a water tower or water connected to the closed-loop system including the radiator 52 of FIG. 1, as will suit the design expedients of any given utilization of the present invention. As a net result of the operation of the $CO_2$ separator 32, there normally is a temperature increase in the main gas flow from the conduit 70 to the conduit 42. This is due to the fact that the absorption of $CO_2$ gas into the MEA is exothermic. There is also a small pressure drop between the conduit 70 and the conduit 42. In order to have the temperature of the $CO_2$-rich MEA in the conduit 98 sufficiently low with respect to temperatures achievable within the stripper tank 108, it may be desirable in some instances to provide cooling within the absorber tank 92, such as by the inclusion therein of a heat exchanger 188 supplied with external coolant so as to keep the temperature of the MEA in the absorber 92 sufficiently low. In this case, there can be virtually no temperature rise between the conduit 70 and the conduit 42. As is known, this type of $CO_2$ separator operates in dependence upon relative temperatures between the absorption of the $CO_2$ into the MEA and the expulsion of the $CO_2$ from the MEA, within certain limits. In any event, the cooler the MEA as it enters the conduit 98, the more likely an efficient $CO_2$ removal process will result. This, with a proper temperature difference and other parameters, the inlet 96 will be supplying relatively $CO_2$-free MEA to the process, which further enhances the successful operation of $CO_2$ separation. Also, the heat exchanger 64 (FIG. 1) can bring the main gas stream in the conduit 70 to substantially the same temperature as the coolant in the conduit 66, thereby tending to keep the gas influx cool (such as under 100° F.). If the heat exchanger 64 were not utilized, the temperature ratios within the $CO_2$ separator 32 would have to be adjusted accordingly, possibly with some loss of performance.

The net effect of the $CO_2$ separator 32, if properly designed in accordance with the foregoing considerations, can be accommodated by the main gas stream, other than removing $CO_2$ therefrom. In other words, there need not be a substantial temperature change between the conduit 70 and the conduit 42, and the pressure differential between them, although significant, is supplied by the compressor 58, in accordance with the invention.

The operation of the system illustrated in FIG. 1 (including FIG. 2) achieves, in addition to supplying substantially pure $CO_2$ to the gas laser 20, a removal of waste heat generated by the laser, and the supplying of electric power to the gas laser 20. It does this in response to energy provided to the prime mover, such as by fuel supplied to the gas turbine 60, and the energy sources for the fan 54 (FIG. 1) and the pump 100 (FIG. 2), which may typically be normal alternating-current electric power, or any other suitable source. Power requirements of the fan 54 and the pump 100, are very small compared to the rest of the system: therefore, essentially, the system is supplied fuel to the gas turbine 60 and in return delivers laser energy through one of the mirrors 22, 24.

As is known in the art, gas lasers are relatively inefficient devices. This is, the amount of energy supplied to the gas laser by the power supply 86 far exceeds the amount of energy which may be extracted from the laser in the form of optical power (coherent electromagnetic radiation). For instance, it has been theorized that the maximum efficiency of a gas laser is under 40 percent. Thus, if nothing else were done to the effluent from the gas laser 20 within the conduit 38, the waste heat appearing in the main gas flow in the conduit 38 would have to be removed. Thus, the temperature of the gas in the conduit 38 may be somewhere between 300° and 500° F. As it passes through the heat exchanged 40, the temperature of this gas may drop to something on the order to 150°—200° F. in the conduit 44. It is then further cooled in the heat exchanger 46 to a very near ambient air temperature, and therefore may be at about 100° F. in the conduit 56. The compressor ratio of the compressor 58 may vary between 4 and 16 to 1; a typical ratio might be in the neighborhood of 10 or 12 to 1. This depends in large part on the amount of work to be extracted from the main gas flow stream by the expander (turbine) 80 in generating electrical power. The heat supplied to the gas in the compressor 58 may cause the temperature in the conduit 62 to be on the order of 400° to 600° F. As described hereinbefore, after leaving the compressor 58, the main gas stream may be further cooled in the heat exchanger 64 to a temperature (about 100° to 120° F.) dependent upon the operating conditions of the $CO_2$ separator. The gas will leave the separator in the conduit 42 at approximately the same temperature as the gas in conduit 70, so that it is capable, within the heat exchanger 40, of extracting significant amounts of heat from the main gas effluent in the conduit 38. As the gas leaves this heat exchanger 40 within the conduit 74, it may have increased in temperature to 300° or 400° F. The exhaust of gas turbine in the conduit 76 may be approximately 900° F., so that the heat exchanger 72 will raise the main gas stream temperature to about 700° or 800° F. in the conduit 78. The gas turbine exhaust outflow in the conduit 84 may be roughly 300° to 500° F., which is suitable for operating the stripper in the $CO_2$ separator. The expander 80 may have a pressure ratio on the order of 8 to 1, and will result in lowering the temperatures from about 700° F. to about 100° F., in a typical situation, wherein a high concentration of $CO_2$ is required in the gas laser, (i.e., the main gas stream will be proportionately more $CO_2$ and less of other gases). In such situations a relatively small stream of gas is directed to the expander 80, which may make other embodiments described herein desirable, as is described more fully hereinafter.

As described, the embodiment of FIG. 1 achieves a primary objective in providing for a separation of $CO_2$ from other gases required by the gas laser in order to permit operation of the mixing type of laser in a closed-cycle configuration. Note particularly that the pressure of the main gas stream, as it enters the separator 32 can be very high, while the pressure of the energizing and relaxing gases in the conduit 34 as they enter the laser can be quite low, due to the operation of the expander 80 in converting the energizing and relaxing gases from a high pressure to a low pressure. This increases the operating efficiency and capacity of the separator 32. Additionally, the energy resulting from high pressure at the input to the separator 32 is recouped by generating electrical power as a result of pressure conversion in the expander 80. In addition, the inherent heat energy which is put into the main stream of gas is utilized most effectively by the regenerative heat exchanger 40 converting heat at the effluent of the laser (conduit 38) into enthalpy within the gas in conduit 74, which is recouped by the expander 80 in generating electrical power (82). Additionally, a great deal of the enthalpy in the exhaust of the turbine, within conduit 76, is also recovered in the form of an increase in the enthalpy in conduit 78 for eventual recoupment as electrical energy. The remaining enthalpy in the gas turbine exhaust 84 is substantially utilized to supply the heat required for operation of the $CO_2$ stripper within the $CO_2$ separator 32, as described hereinbefore.

Figure 3:
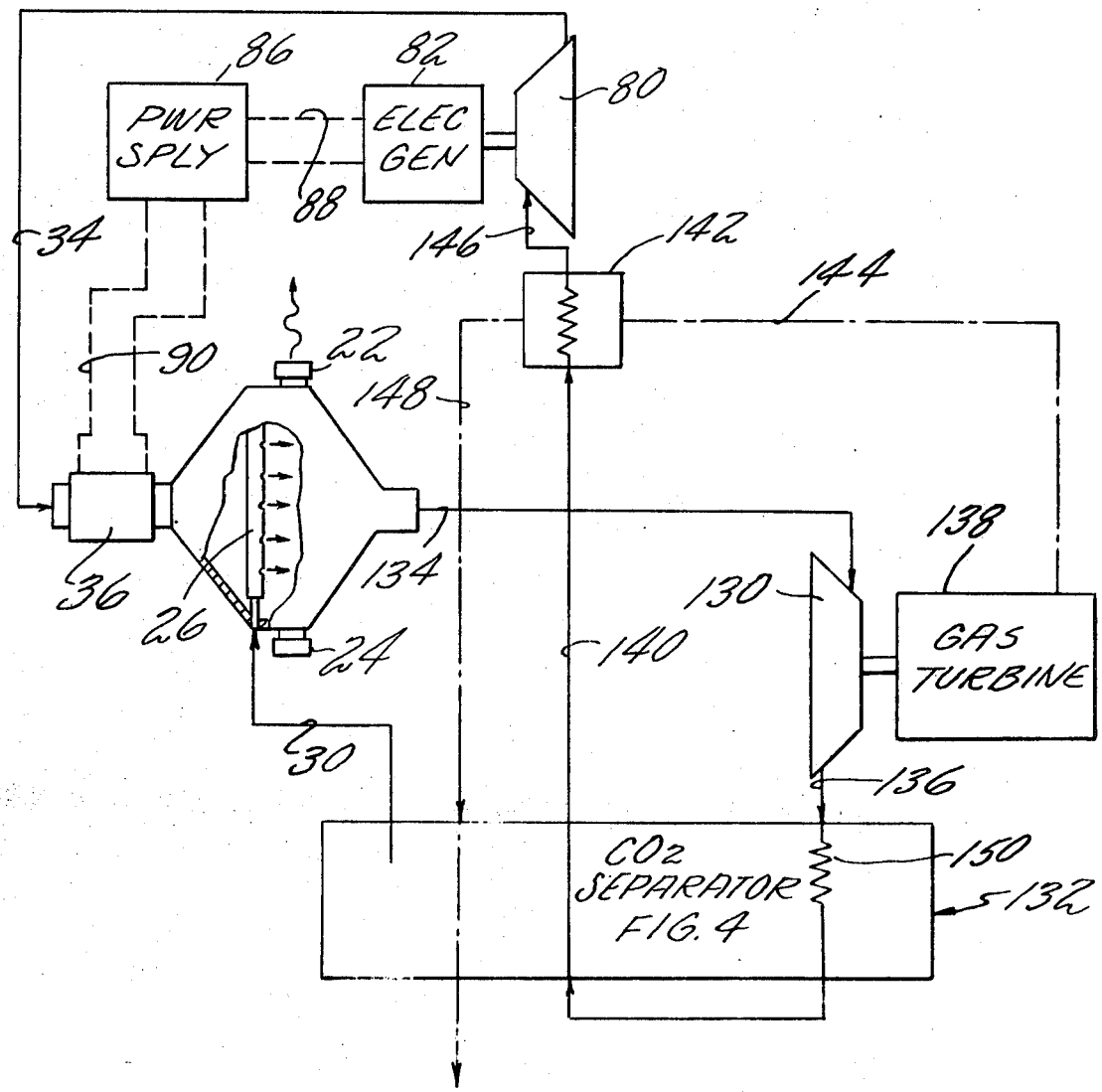

A second embodiment of the invention is illustrated in FIG. 3. Therein, all of the elements of the system which function identically with the elements of the embodiment of FIG. 1 have like reference numerals. The major difference of this embodiment is that instead of using the regenerative heat exchanger 40 and coolant heat exchangers 46 and 64 (as in FIG. 1) the embodiment of FIG. 3 does not precool the gas prior to compression in a compressor 130, and the main gas stream enthalpy is removed only by use in the $CO_2$ separator 132 as a source of heat (exchanger element 150) for the stripper. Assuming, as in the embodiment of FIG. 1, that the gas effluent from the laser 20 in a conduit 134 is between 300° and 500° F., then a larger compressor 130 is required in order to provide a suitably high pressure in a conduit 136 for proper operation of the $CO_2$ separator 132. This, to achieve the pressure ratio in the neighborhood of 12 to 14 to 1, a gas turbine 138 must be capable of supplying more power to the compressor 130 than does the turbine 60 supply the compressor 58 (FIG. 1). In the conduit 136, the temperature of the main gas stream may be in the neighborhood of between 700° and 900° F. As the gas leaves the $CO_2$ separator in a conduit 140 it will be approximately 100° F, due to the cooling action of the heat exchanger 118 within the absorber component of the $CO_2$ separator 132. The conduit 140 is connected to a heat exchanger 142 to which hot exhaust gas from the turbine 138 is supplied in a conduit 144. This gas may be at about 900° F. and it may result in raising the temperature of the main gas flow in a conduit 146 to approximately 700° F. The outflow of the exhaust gas in a conduit 148, which is also used as a heat source for the stripper within the $CO_2$ separator 132, may be at a temperature of approximately 450°. The conduit 146 feeds the main gas stream into the expander 80 which expands the gas by an amount determined by the compression ratio of the compressor 130, the pressure drop within the $CO_2$ separator 132, and other pressure losses in the system. The outflow from the expander 80 in the conduit 34 is somewhere between 80° and 100° F. as in the case of the embodiment of FIG. 1.

Figure 4:
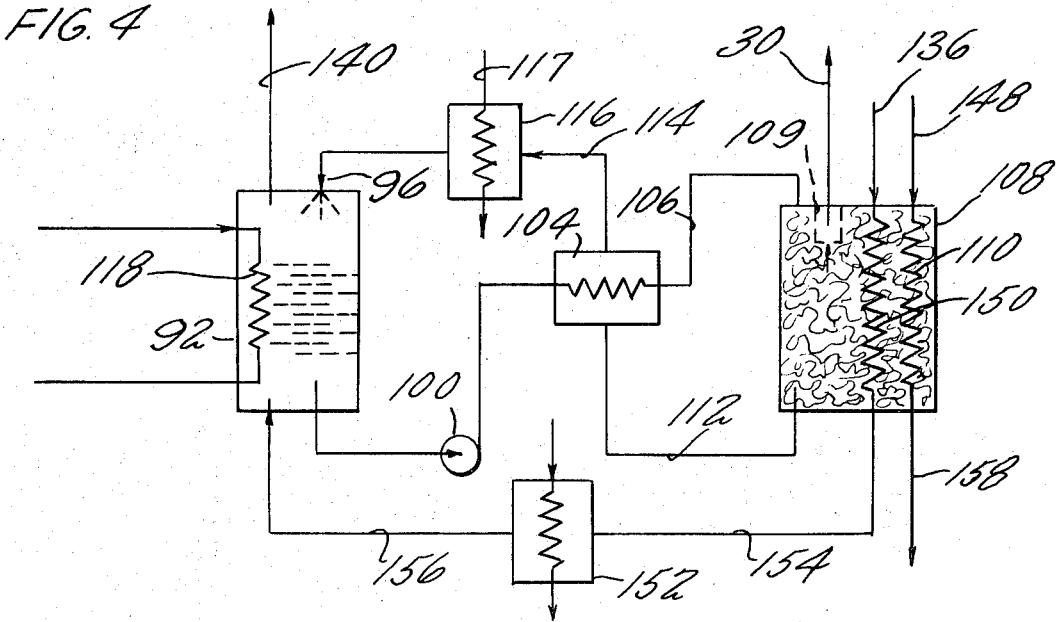

The $CP_2$ separator 132 for use in the embodiment of FIG. 3 is illustrated in FIG. 4. Therein, the primary difference between the separator 32 illustrated in FIG. 2 and the provision of an additional heat exchange element 150, and the provision of a heat exchanger 152 which cools the gas supplied thereto over a conduit 154 from the heat exchange element 150 prior to passing it over a conduit 156 to the absorber 92. Thus, the temperature of the gas is lowered markedly as it passed through the stripper.

The basis difference between the embodiment of FIGS. 3 and 4 from that of FIGS. 1 and 2 is that a larger turbine and compressor are required, and more heat energy is rejected in the effluent from the exhaust conduit 158 (FIG. 4) as it leaves the stripper heat exchanger 110. However, less hardware is required in the embodiment of FIGS. 3 and 4. In the case where efficiency of the laser is high, or there being a high gas flow through the system so that the effluent from the laser does not reach as high a temperature, then the embodiment of FIGS. 3 and 4 is likely to be preferable to the embodiment of FIGS. 1 and 2.

Figure 5:
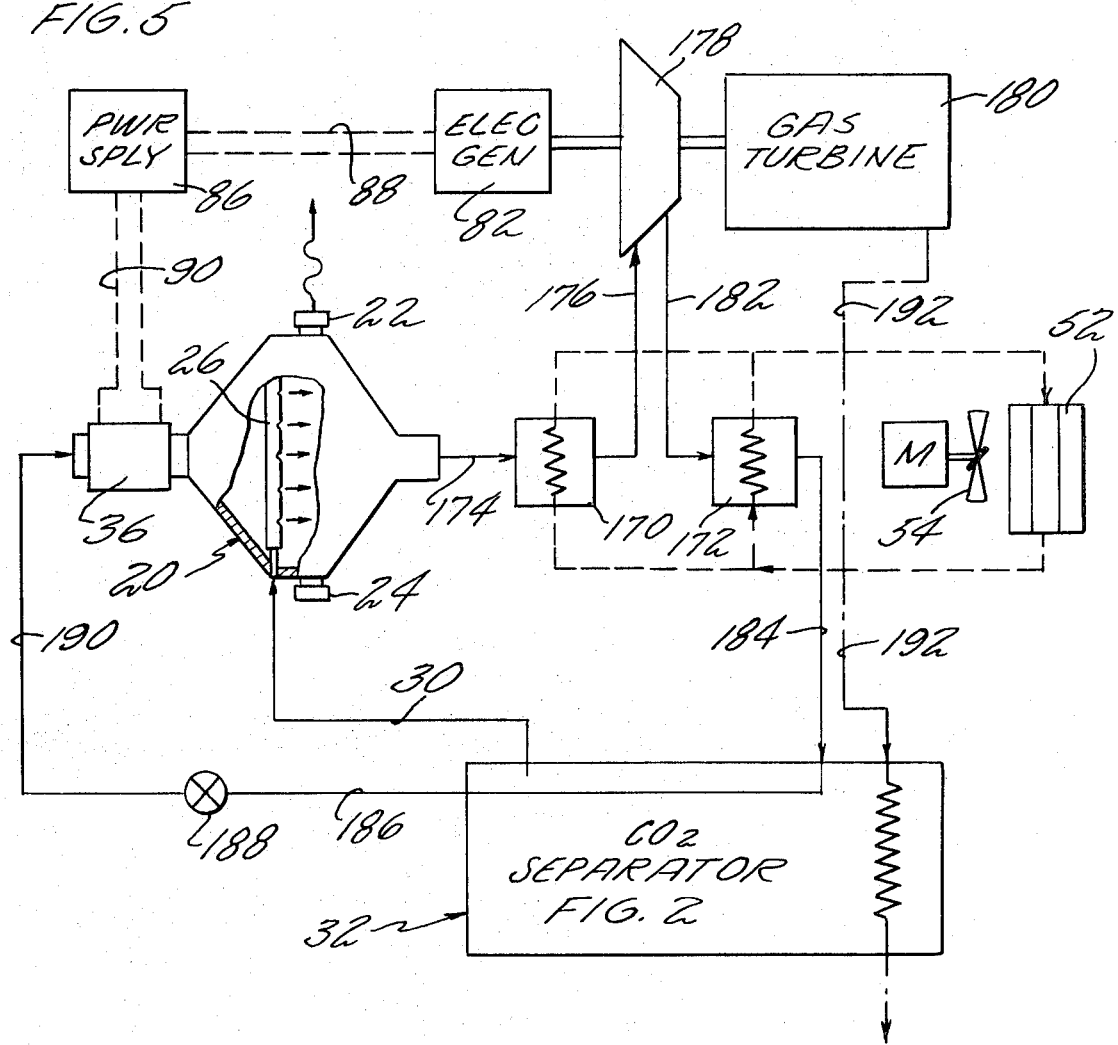

A further embodiment of the invention is illustrated in FIG. 5. Therein, a coolant system including the air heat exchanger or radiator 52 and and fan 54 includes a pair of heat exchanges 170, 172 for precompression and postcompression cooling of the main gas stream. Specifically, a conduit 174 carries the laser effluent through the heat exchanger 170 to cool it sufficiently in a conduit 176 so that the size of a compressor 178 and, the power requirements of a gas turbine 180 which drives the compressor, can both be reduced. This, the gas in the conduit 174 may be between 400° and 500° F., but the gas entering the compressor 178 in the conduit 176 will be at roughly 100° F. After compression, the gas in a conduit 182 may be at roughly 300° F., assuming a compression ratio in the neighborhood of 4 or 6 to 1. This gas then is cooled in the heat exchanger 172 so that the main stream of gas in a conduit 184 is again returned to approximately 100° prior to entering the $CO_2$ separator 32 (FIG. 2, as described hereinbefore). As in the embodiment of FIG. 1, the gas leaving the $CO_2$ separator 32 in a conduit 186 may be at roughly 100° F. However, the pressure, which was increased significantly by the compressor 178 in order to facilitate operation of the $CO_2$ separator 32, may be higher than desired for use in the laser 20, so that a pressure-reducing valve 188 may be necessary in order to provide the energizing and relaxing gases in a conduit 190 at a suitably low pressure for entrance into the electric excitation portion 36 of the laser 20. Similar to the embodiment of FIG. 1, the exhaust from the gas turbine in a conduit 192, which may be at about 900° F., may be utilized to supply heat to the stripper portion of the $CO_2$ separator 32.

This embodiment is simpler than the embodiments of either FIG. 1 or FIG. 3 since it does not use an expander 80. Instead, pressure reduction at the outflow of the $CO_2$ separator 32 prior to reentry into the laser 20 is provided by a simple reducing valve 188. The embodiment of FIG. 5 may find its most advantageous utilization in a system in which the $CO_2$ concentration in the main gas flow is relatively low, thus permitting a smaller $CO_2$ separator 32; or in a system where the pressure within the laser 20 can be somewhat higher than it may be in other embodiments.

This, the present invention provides, suitably for implementation in a variety of embodiments, a closed-cycle, flowing, mixing gas laser system which compresses the outflow of the gas laser so as to provide a suitably high pressure for operation of lasing-gas-separating means, and separately conducts the lasing gas to one input of the laser, and gases excluding the lasing gas, through a pressure reducer, to the other input of the laser. A variety of heat exchange means may be used for removing waste heat generated within the laser and maintaining minimum compressor loads.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A closed-cycle flowing gas laser system comprising:
   a gas laser having a laser cavity, first inlet means for introducing at least an energizing gas into said laser cavity, second inlet means for introducing a lasing gas in proximity with said laser cavity, and an effluent outlet;
   a compressor;
   means for separating laser gas from the remaining gases in said laser outflow and having a first outlet means providing gas exclusive of lasing gas and a second outlet means providing lasing gas;
   first flow means including a gas expander connected to said first outlet for conducting gas from said separating means to said first inlet of said gas laser and for reducing the pressure in the gas therein;
   second flow means connected to said second outlet for conducting lasing gas from said separating means to said second inlet of said gas laser;
   third flow means for conducting gas from said effluent outlet to said compressor; and
   fourth flow means for conducting gas from said compressor to said separator means.

2. The gas laser system according to claim 1 wherein said gas expander comprises a turbine expander.

3. A gas laser system according to claim 1 wherein said gas expander comprises an expansion valve.

4. The gas laser system according to claim 1 wherein said third flow means includes means connected to the effluent outlet of said laser for cooling the effluent and passing the cooled effluent to said compressor.

5. The gas laser system according to claim 4 wherein said cooling means comprises a regenerative heat exchanger having a heat source exchange element located in said third flow means and a heat sink exchange element located in said first flow means.

6. The gas laser system according to claim 4 wherein said cooling means comprises a heat exchanger with a heat sink exchange element adapted to receive coolant from an external source.

7 The gas laser according to claim 4 additionally comprising:
an air-cooled liquid coolant closed-cycle system; and
wherein said cooling means comprises a heat exchanger having a heat sink exchange element connected serially within said coolant supply system.

8. The gas laser system according to claim 4 wherein said fourth flow means includes means connected to the outflow of said compressor for cooling said outflow and passing the cooled outflow to said separating means.

9. The gas laser system according to claim 1 wherein said separating means includes a heat-responsive stripper and wherein said fourth flow means includes a heat source exchange element located within said stripper for supplying heat to said stripper prior to the passage thereby of the gases therein into said separating means for the separation of the lasing gas therefrom.

10. The gas laser system according to claim 1 including an internal-combustion-type prime mover means drivingly connected to said compressor for driving said compressor, and having an exhaust outflow;
and wherein said separating means includes a heat responsive stripper having a heat source exchange element therein, said heat source element being connected to said exhaust outflow thereby to derive heat therefrom.

* * * * *